United States Patent [19]

Miller

[11] Patent Number: 4,593,409

[45] Date of Patent: Jun. 3, 1986

[54] TRANSCEIVER PROTECTION ARRANGEMENT

[75] Inventor: Jerry A. Miller, Tamarac, Fla.

[73] Assignee: Motorola, Inc., Schaumburg, Ill.

[21] Appl. No.: 596,748

[22] Filed: Apr. 4, 1984

[51] Int. Cl.[4] .......................... H04B 1/40; H04B 1/04; H04B 17/00

[52] U.S. Cl. .......................... 455/73; 455/67; 455/117; 455/127; 455/349; 455/343; 455/129; 343/703; 343/894; 320/48

[58] Field of Search .................. 455/73, 67, 115, 117, 455/127, 129, 217, 343, 349, 90, 128, 347; 343/703, 894, 702, 858, 872; 371/20, 25; 324/66, 133; 340/825.34, 635, 636, 657, 693; 320/48; 364/481

[56] References Cited

U.S. PATENT DOCUMENTS

| | | |
|---|---|---|
| 3,069,624 | 12/1962 | Friedman . |
| 3,500,458 | 3/1970 | Cannalte ............................ 455/127 |
| 3,720,874 | 3/1973 | Gorcik et al. ........................ 455/89 |
| 3,737,782 | 6/1973 | Pierce ................................. 455/226 |
| 3,852,669 | 12/1974 | Bowman et al. . |
| 3,855,534 | 12/1974 | Holcomb et al. ................... 455/349 |
| 3,870,957 | 3/1975 | Straw . |
| 3,969,673 | 7/1976 | Nordlof ................................ 455/89 |
| 4,041,395 | 8/1977 | Hill . |
| 4,096,441 | 6/1978 | Schwartz . |
| 4,274,156 | 6/1981 | Trefney ............................... 455/115 |
| 4,370,694 | 1/1983 | Hargrave . |
| 4,430,728 | 2/1984 | Beitel et al. ..................... 340/825.34 |

FOREIGN PATENT DOCUMENTS 18940 11/1980 European Pat. Off. ............. 455/90

Primary Examiner—Jin F. Ng
Attorney, Agent, or Firm—Mark P. Kahler; Jerry A. Miller; Joseph T. Downey

[57] ABSTRACT

A warning and protection circuit arrangement suitable for use in conjunction with a two-way portable transceiver having a removable battery pack/antenna includes a battery enclosure containing an antenna structure. A circuit is enclosed inside the battery enclosure for providing information indicative of certain predetermined parameters of the antenna or the battery. This information may be used by the transceiver to provide the user with an alert in the event an inappropriate battery pack/antenna is being used. The information may also be used to modify the normal operation of the transceiver to avoid possible damage.

30 Claims, 4 Drawing Figures

TRANSCEIVER PROTECTION ARRANGEMENT

BACKGROUND OF THE INVENTION

1. Field of the Invention

This invention relates generally to the field of two-way portable transceivers having removable antenna structures and an arrangement for protecting the transmitter from an improper antenna. More particularly, this invention relates to the field of two-way portable transceivers incorporating integral battery pack/antennas and an arrangement for warning the user or taking protective action if an inappropriate battery pack/antenna is attached to his transceiver.

2. Background

In a copending U.S. patent application, entitled "Low Profile Antenna Suitable for Use With Two-Way Portable Transceivers", to Stelios Patsiokas and Oscar Garay, Ser. No. 06/596,800 and assigned to Motorola, Inc., the assignee of the present invention, filed of common data herewith, an antenna structure suitable for use inside the battery enclosure of a two-way portable transceiver is described and claimed. This copending patent application is hereby incorporated by reference and made a part of this document as if disclosed fully herein.

The use of antenna structures disposed within the battery pack enhances the appearance and size of two-way portable transceivers and under certain conditions may even improve radiation efficiency over conventional top mounted whip, helical or dipole antennas. However, by placing the antenna within the battery enclosure, the likelihood of installation of an inappropriate battery pack/antenna increases since the battery pack is a frequently removed and installed item. This could result in poor performance or inadvertent damage to the radio transmitter by using an antenna designed to operate in a completely different band.

This problem could, of course, be solved by creating a different mechanical coupling arrangement between the transceiver and the battery pack/antenna for each frequency band or each antenna requirement. While this is an effective solution, it requires that a number of different transceiver and battery enclosures be tooled, designed manufactured and stocked. This could result in a prohibitively expensive mechanism for preventing such problems.

In more conventional top mounted antenna arrangements for two-way portable transceivers, the likelihood of installation of an inappropriate antenna is low due to the frequent use of differing antenna connectors for various frequency bands. Also, since the antenna structure itself is visable to the user, its physical size and appearance serve to indicate to the user that he has his usual antenna attached. However, it is unusual for the user of a transceiver having conventional top mounted antenna structures to have need to remove the antenna. This is only likely to occur during service, testing or installation of some form of power boosting accessory.

Such is not the case for the user of a transceiver having a battery pack/antenna. When the battery cells are depleted, it is frequently the case that the user will substitute a spare while the original battery pack is charging. Some users prefer to use disposable primary cells in lieu of charging rechargable cells. These users are frequent purchasers of new battery packs (and thus antennas) and the inadvertent purchase of an inappropriate battery pack/antenna could clearly result in unexplainable poor performance, reduced transmitter and receiver range or even damage to the transmitter.

Thus, it is desirable to provide the user with an indication that the battery pack/antenna is inappropriate if this is the case. If the transmitter is susceptible to damage from an improper load, it may also be desirable to inhibit transmitter operation in the event an inappropriate antenna is attached or at least modify the transmitter operation by reducing the power output to the antenna or reducing the allowable transmit time.

SUMMARY OF THE INVENTION

It is an object of the present invention to provide a protection and warning arrangement for use in conjunction with two-way transceivers to warn or take protective action in the event an inappropriate antenna is attached.

It is another object of the present invention to provide a battery pack/antenna arrangement capable of communication with its associated transceiver to provide information about characteristics of the antenna.

It is another object of the present invention to provide an electronic interlock system for a transceiver and its antenna to prevent inadvertent use of an antenna which could potentially damage the transceiver.

It is a further object of the present invention to provide an improved battery pack/antenna arrangement.

These and other objects of the present invention will become apparent to those skilled in the art upon consideration of the following description of the invention.

In one embodiment of the present invention, a warning and protection circuit arrangement for use in conjunction with a transmitter includes an enclosure and an antenna disposed within the enclosure. A circuit is disposed within the disclosure for providing electrical information indicative of certain predetermined characteristics of the antenna.

In another embodiment of the present invention, a warning and protection circuit arrangement for use in conjunction with a two-way portable transceiver utilizing a battery pack/antenna includes an antenna structure suitable for use in conjunction with the two-way transceiver and a package for packaging the antenna structure. A code plug is disposed within the package and contains coded information associated with certain predetermined characteristics of the antenna for providing the information to the transceiver so that the transceiver may read the coded information to determine the characteristics of the antenna structure and take appropriate action based upon that information.

In another embodiment of the present invention, a method of protecting a transmitter against an unsuitable antenna includes the steps of reading an antenna coded associated with an antenna, comparing the antenna code with a stored code and generating a predetermined signal if the antenna code and the stored code do not match.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

DESCRIPTION OF THE INVENTION

Figure 1:
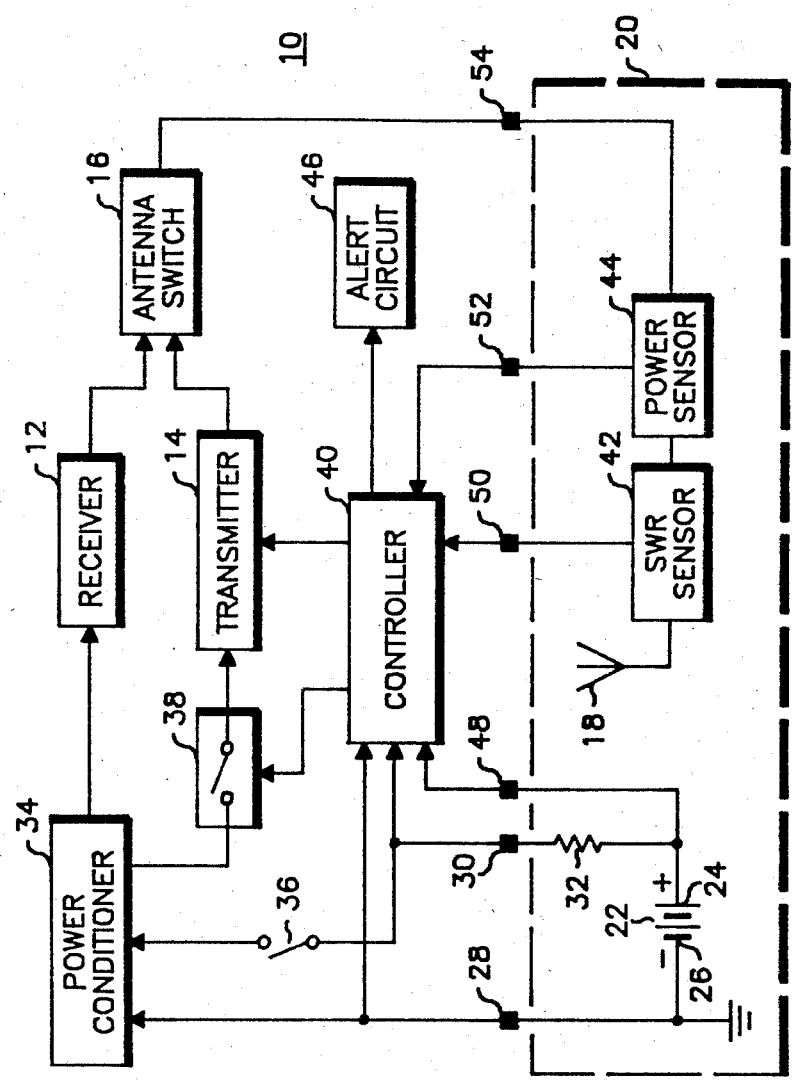
FIG. 1 shows a transceiver system according to one embodiment of the present invention incorporating various sensing circuits in the battery pack/antenna.

Turning now to FIG. 1, a transceiver system 10 embodying one form of the present invention is shown. System 10 includes a receiver 12 and a transmitter 14, both of which are coupled to an antenna switch 16 which is used to selectively couple either receiver 12 or transmitter 14 to an antenna 18 according to whether the transceiver system 10 is in the transmit or receive mode as is well known in the art. In the preferred embodiment, antenna 18 is disposed within a removable battery enclosure 20 shown in broken lines in FIG. 1.

An electrical battery 22 is also disposed within battery enclosure 20 so that battery enclosure 20 forms the enclosure of a combination battery pack/antenna. Electrical battery 22 includes a positive electrode 24 and a negative electrode 26. Negative electrode 26 normally forms the ground potential for the transceiver and is coupled to a negative terminal 28 of the battery enclosure 20. Positive electrode 24 may be coupled to a positive battery terminal 30 through a small current limiting resistor 32. Battery power is then supplied to the transceiver system via terminals 28 and 30 when the battery pack/antenna is coupled to the remainder of the transceiver.

It may be desirable in some instances to condition the battery voltage in some manner for use by the various circuits of the transceiver with a power conditioner 34. This power conditioner 34 may take the form of voltage regulators, dc to dc converters, filters, etc. or combinations thereof depending upon the particular transceiver. Power is supplied to the transceiver system by actuating a power switch 36 which completes the battery circuit to the power conditioner.

Power conditioner 34 may provide power to transmitter 14 through a controllable switch 38 which may be a relay or a transistor or the like. The operation of switch 38 as well as various characteristics of the transmitter 14 such as power output and maximum allowable duration of transmission may be controlled by a controller 40.

In the present embodiment of this invention, controller 40 may receive signals from various sensors to determine how well the antenna 18 and the transmitter 14 are functioning together. Such sensors may include an SWR sensor 42 and a power sensor 44 coupled between transmitter 14 and antenna 18. Also, battery voltage and current during transmit may be analyzed to assure that they are in the proper range. This may be accomplished by analyzing the voltage on each side of resistor 32 as one skilled in the are will recognize.

Controller 40 may analyze any or all of the above-mentioned parameters to determine that the operation of the antenna is acceptable. If an improper antenna is connected, the battery current may either increase or decrease beyond the limits of normal operation for a given battery voltage. Similarly, output power should be within specification for a given battery voltage as should SWR. Of course, it is clear that in a hand held transceiver the SWR and power output may vary rather radically according to the manner the radio is held, etc. SWR readings as high as 6 to 1 or even higher may occur under such conditions. Therefore any decisions made by controller 40 on the basis of these sensor readings should allow for such variations.

Circuitry for implementing SWR sensor 42 and power sensor 44 is well known in the art and may resemble conventional directional coupler circuitry which may supply input signals to comparators within controller 40. It should be noted that the transmission line coupling antenna switch 16 to antenna 18 may be a stripline or similar structure which may be printed adjacent coupled transmission lines for use as a portion of the sensors without signficantly disturbing circuit operation.

Controller 40 may analyze any or all of the various battery parameters and SWR and power parameters to determine that the antenna is appropriate for the transmitter. If they are appropriate for one another normal transmitter operation is allowed when the transmitter is actuated. If, however, the antenna is deemed by the controller 40 to be inappropriate, one of several actions may be taken. In one such action, controller generates a signal which actuates an alert circuit 46 which provides the user with a warning that something may be wrong. This warning may, of course, take many forms. It may be a visual alert such as a flashing light or a display indicating the nature of the possible problem. An audible alert may also be actuated to warn the user of problems. Other alert or warning arrangements will occur to those skilled in the art.

In the alternative or in addition to the above alert, alteration to the normal operation of the transmitter may be implemented. This may include inhibiting actuation of the transmitter by opening switch 38 to prevent transmission. Other modifications to standard operation may include reduction in power output of the transmitter and reduction in allowable transmit time. The former may be implemented by altering the bias of the transmitter's power amplifier while the latter may be readily implemented by modifying the operation of the transceiver's time-out-timer if it is so equipped.

Any or all of the above actions may be taken in a prescribed preset manner or the controller may decide how severe the problem is and select a course of action based upon that decision. The severity of the action taken may also be based upon the transmitter's ability to tolerate an inappropriate load. It may also be desirable to allow provisions for manual override of the controller's decisions and actions to account for emergency situations where it is essential that communication be attempted.

It should be noted that in the form described above the present invention requires up to six terminals on the battery enclosure (labelled 28, 30, 48, 50, 52, and 54) three of which are added as a direct result of the present invention. This may prove to be a disadvantage in some transceiver systems which require water sealed enclosures. A later embodiment of this invention addresses this potential problem.

Figure 2:
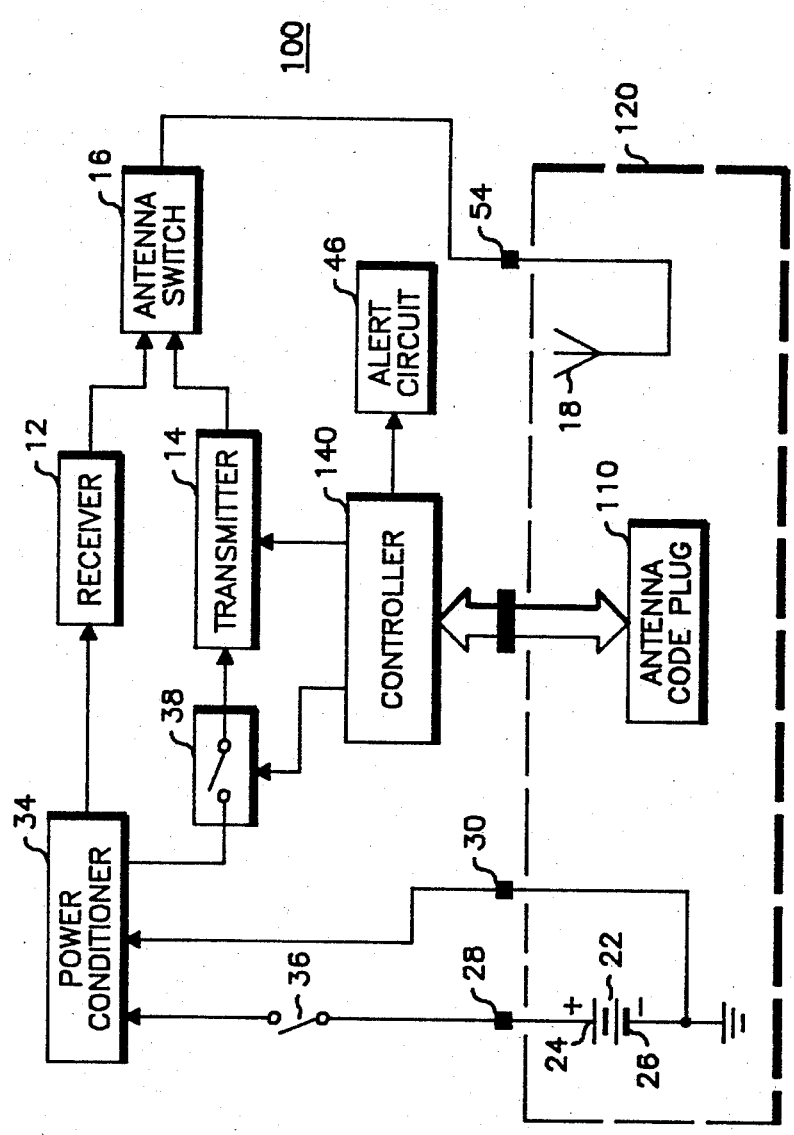
FIG. 2 shows a preferred embodiment of the present invention utilizing an antenna code plug.

Turning now to FIG. 2 a preferred embodiment of the transceiver system of the present invention is shown generally as 100. This transceiver system is configured similarly to system 10 but utilizes a code plug 110 instead of the various sensors of the previous embodiment. This code plug 110 may be in the form of a semiconductor ROM or may be a simple hard-wired coding device. Code plug 110 may contain various information regarding certain predetermined characteristics of the antenna, such as frequency of intended operation, which may be read by the controller 140 to determine the appropriateness of the antenna. When such determination is made, the controller may take action similar to those mentioned earlier.

In addition, code plug 110 may contain other information to be read by controller 140 (which may incorporate a microcomputer). For example, for radios which are to be used in hazardous environments, only approved battery packs should be used. By reading code plug 110, controller 140 may determine that the battery pack is unsafe and take appropriate action such as warning the user or inactivating the transceiver. The transceiver owner's code or the code for a specific transceiver may also be stored in this code plug so that if the transceiver is stolen replacement battery packs will not be easily obtained thus discouraging theft. Similarly, stolen battery packs will be useless except on matching radios.

The present embodiment provides other benefits in addition. In this embodiment, controller 140 may determine the appropriateness of the battery pack/antenna immediately upon powering up the transceiver without waiting for the first actuation of the transmitter. Also, a simple code plug may be likely to provide a more cost effective solution to the present problem than the elaborite sensing system of transceiver system 10. Transceiver system 10 has the advantage of supplying continuous monitoring of the operation of the transceiver which may outweigh cost considerations in some applications.

Figure 3:
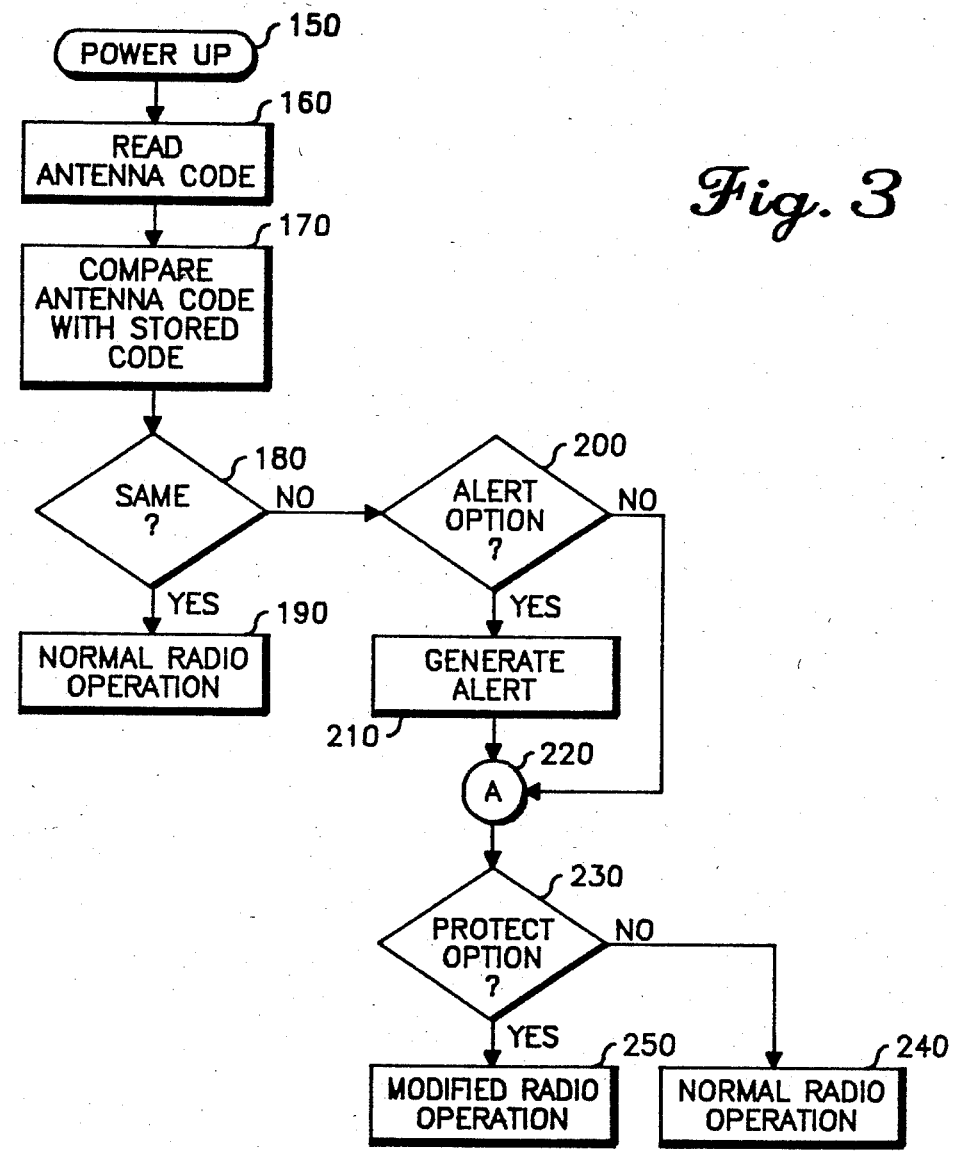
FIG. 3 shows a flow chart of the operation of the system of FIG. 2.

Turning now to FIG. 3, a flow chart of the preferred system operation of transceiver system 100 is shown. Initial power-up of the transceiver by closing switch 36 occurs at step 150. At step 160 the antenna code plug is read by controller 140. At step 170 the code is examined by the controller and certain parameters of the antenna code may be compared with a stored code by the controller at step 180. Other parameters may simply be read as data by the controller. If the codes correlate appropriately normal radio operation may proceed at step 190.

If on the other hand the codes do not correlate appropriately control proceeds to step 200 to determine if the transceiver is equipped for some form of alert. If so, program control proceeds to step 210 where the alert is generated. Control then proceeds to step 220. If no alert option is present, control also proceeds to step 220. At step 230 the transceiver is inspected to determine the presence of a protection option. If not normal radio operation is allowed at step 240. If so, The operation of the transceiver is appropriately modified at step 250.

Figure 4:
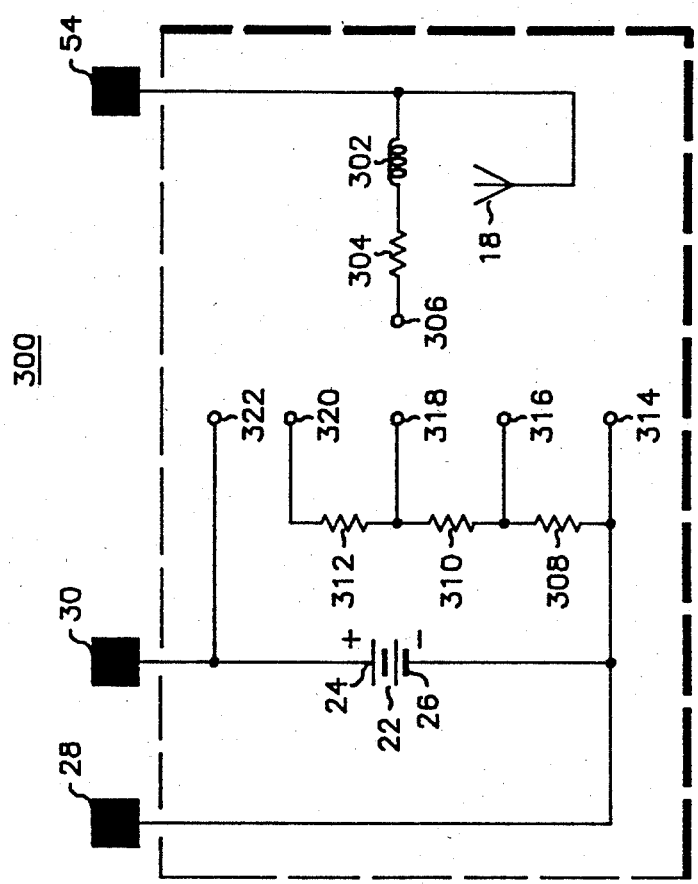
FIG. 4 shows an alternate coding arrangement for use in conjunction with the present invention.

As shown in FIG. 2, enclosure 120 may require a number of additional terminals to transmit information to and from code plug 110. The implementation shown in FIG. 4 may provide an effective mechanism for implementing a simple code plug which uses no more terminals than were necessary without utilizing this invention. This arrangement is shown generally as 300 and incorporates a radio frequency choke 302 coupled to the antenna terminal 54. Choke 302 is used to prevent the coding mechanism from altering the performance of antenna 18. A resistor 304 may be placed in series with choke 302 to limit current through terminal 54. The free end of resistor 304 forms a circuit node 306.

A series of resistors 308, 310, and 312 are coupled to the negative electrode (or positive if this scheme is reversed) of battery 22. Each of the resistor terminals forms a new circuit node 314, 316, 318, and 320 respectively. Another circuit node 322 is formed by the positive electrode 24 of battery 22. To encode this form of code plug, node 306 is connected to one of nodes 314, 316, 318, 320, or 322 or some combination thereof to indicate a particular battery and/or antenna configuration.

By externally applying a pullup resistor to terminal 54 battery drain may be controlled when the transceiver is off and the code plug may be read by simply reading the dc voltage level at terminal 54. In this manner, no additional terminals are needed and all the advantages of system 100 may be obtained without significant increase in battery pack/antenna cost or degradation in the ability to seal the battery pack/antenna.

Thus it is apparent that in accordance with the present invention an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A warning and protection circuit arrangement for use in conjunction with a two-way portable transceiver utilizing a battery pack with an integral antenna structure, said transceiver including means for reading coded information to determine that an appropriate antenna is connected; said arrangement comprising:
   a removable antenna structure suitable for use in conjunction with said two-way portable transceiver;
   packaging means for packaging said removable antenna structure; and
   coding means, packaged within said packaging means and containing coded information associated with certain characteristics of said antenna, for providing said coded information to said transceiver;
   whereby, said transceiver reads said coded information to determine the characteristics of said antenna structure and provides a warning or takes other protective action to avoid transmitter damage based upon said information.

2. The warning and protection circuit arrangement of claim 1, wherein said coding means includes a read only memory element.

3. The warning and protection circuit arrangement of claim 1, wherein said packaging means includes a battery pack housing.

4. The warning and protection circuit arrangement of claim 3, further including latching means for mechanically latching said battery pack housing to said transceiver.

5. A warning and protection circuit arrangement suitable for use in conjunction with a transmitter, said transmitter including means for reading electrical information indicative of certain predetermined antenna characteristics and for providing a warning or taking other protection action to prevent transmitter damage based upon said electrical information, said circuit arrangement comprising:
- an enclosure which is removably attachable to said transmitter;
- an antenna disposed within said enclosure; and
- circuit means disposed within said enclosure for providing said electrical information indicative of said certain predetermined characteristics of said antenna to said transmitter.

6. The warning and protection circuit arrangement of claim 5, wherein said circuit means includes coding means containing coded information associated with certain predetermined characteristics of said antenna.

7. The warning and protection circuit arrangement of claim 6, wherein said coding means includes a read only memory element.

8. The warning and protection circuit arrangement of claim 5, wherein said circuit means includes monitoring means for producing a signal indicative of the electrical performance of said antenna.

9. The warning and protection circuit arrangement of claim 8, wherein said monitoring means includes a standing wave ratio detector, and wherein said signal is indicative of the quality of the standing wave ratio of radio frequency energy directed to said antenna.

10. The warning and protection circuit arrangement of claim 8, wherein said monitoring means includes battery monitoring means for monitoring predetermined parameters of an electrical battery as an indication of the performance of said antenna.

11. The warning and protection circuit arrangement of claim 5, further including alerting means responsive to said circuit means for producing an indication that said antenna may be unsuitable for use with said transmitter.

12. The warning and protection circuit arrangement of claim 11, wherein said indication is a visual indication.

13. The warning and protection circuit arrangement of claim 11, wherein said indication is an audible indication.

14. The warning and protection circuit arrangement of claim 5, further including inactivation means responsive to said circuit means for inactivating said transmitter if said antenna is unsuitable for use with said transmitter.

15. The warning and protection circuit arrangement of claim 5, further including power control means for producing a signal capable of altering the power output of said transmitter in response to said circuit means.

16. A circuit arrangement for protecting a transmitter from operation in conjunction with an inappropriate antenna, said circuit arrangement comprising:
- an antenna;
- circuit means associated with said antenna for providing electrical information associated with certain predetermined characteristics of said antenna;
- packaging means for packaging said antenna and said circuit means together; and
- said transmitter including controller means for reading and interpreting said electrical information to determine the appropriateness of said antenna and for producing a predetermined signal in response to said circuit means;
- whereby, suitable transmitter control is effected or suitable warnings are issued in response to said predetermined signal in the event an inappropriate antenna is coupled to said transmitter.

17. The circuit arrangement of claim 16, further including altering means, responsive to said predetermined signal, for producing an indication that said antenna is unsuitable for use in conjunction with said transmitter.

18. The circuit arrangement of claim 17, wherein said indication is a visual indication.

19. The circuit arrangement of claim 17, wherein said indication is an audible indication.

20. The circuit arrangement of claim 16, further including inactivation means for inactivating said transmitter in response to said predetermined signal.

21. The circuit arrangement of claim 16, further including power reduction means for reducing the power output of said transmitter in response to said predetermined signal.

22. A method of protecting a transmitter against an unsuitable antenna, comprising the steps of:
- reading an antenna code associated with an antenna;
- comparing in the transmitter said antenna code with a code stored within said transmitter to determine if said antenna is appropriate for said transmitter; and
- generating a predetermined signal indicative of an improper antenna if said antenna code and said stored code do not match.

23. The method of claim 22 further including the step of generating an alert in response to said predetermined signal.

24. The method of claim 22 further including the step of modifying the power output of said transmitter in response to said predetermined signal.

25. The method of claim 22 further including the step of reducing the maximum allowable time of transmission of said transmitter in response to said predetermined signal.

26. A circuit arrangement for protecting a transmitter from improper loads as a result of installation of an unsuitable battery pack having an internal antenna, said circuit arrangement comprising:
- a battery/antenna pack incorporating an electrical battery, an antenna, and circuit means for providing electrical information indicative of certain predetermined characteristics of said antenna; said electrical battery, said antenna and said circuit means all being enclosed within a single enclosure;
- a transmitter housed in an enclosure separate from said battery/antenna pack but removably attached to said battery/antenna pack; and
- said transmitter including control means for generating a predetermined signal indicative of the suitability of use of said battery/antenna pack in conjunction with said transmitter in response to said electrical information from said circuit means;
- whereby, said predetermined signal is used to generate an alert or modify operation of said transmitter in the event an unsuitable battery/antenna pack is attached to said transmitter.

27. The protection circuit arrangement of claim 26, further including alert means for generating an alert in response to said predetermined signal.

28. The protection circuit arrangement of claim 26, further including power modifying means for modifying the output power of said transmitter in response to said predetermined signal.

29. A warning and protection arrangement suitable for use in conjunction with a two-way transceiver having a removable battery/antenna pack, comprising:
- a battery/antenna enclosure;

an antenna disposed within said battery/antenna enclosure;

an electrical battery disposed within said battery/antenna enclosure;

coding means disposed within said battery/antenna enclosure for providing electrical information indicative of certain predetermined characteristics of said electrical battery to said transceiver; and said radio transceiver including means for reading said electrical information to determine the suitability of using a particular battery/antenna pack and for providing a warning or taking other action to protect said transmitter in the event said electrical information indicates that an improper battery/antenna pack is being used.

30. A circuit arrangement for providing coded information to a transmitter, said transmitter including means for reading said coded information, said coded information being indicative of a predetermined antenna characteristic, comprising:

a battery enclosure;

an electrical battery disposed within said battery enclosure and having a positive and a negative battery terminal for transferring energy to said transmitter;

an antenna disposed within said battery enclosure;

an antenna terminal coupled to said antenna for transferring energy from said transmitter to said antenna; and resistor means coupled from one of said battery terminals to said antenna terminal, said resistor means having a value representative of an antenna characteristic for providing said coded information, whereby said coded information is read by said transmitter.

* * * * *